United States Patent [11] 3,607,742

[72] Inventor William C. Steigerwald, Jr.
 Box 3040, Euclid, Ohio 44117
[21] Appl. No. 837,914
[22] Filed June 30, 1969
[45] Patented Sept. 21, 1971

[54] METHOD AND COMPOSITION FOR PHOSPHATE REMOVAL
 12 Claims, No Drawings
[52] U.S. Cl. ................................................. 210/47,
 210/52, 252/181
[51] Int. Cl. ..................................................... C02b 1/20
[50] Field of Search ............................................ 210/42, 52,
 47; 252/181; 106/210

[56] References Cited
 UNITED STATES PATENTS
 3,082,173  3/1963  Horvitz ........................ 210/52 X
 3,480,144  11/1969  Barth et al. .................. 210/18 X
 FOREIGN PATENTS
 124,192  5/1947  Australia ...................... 210/52
 872,523  2/1942  France ........................ 210/52

*Primary Examiner*—Michael Rogers
*Attorney*—Lane, Aitken, Dunner & Ziems

ABSTRACT: Composition for removing phosphate content of raw sewage and waste comprising a solution of sodium hydroxide, aluminum hydrate, unmodified starch and water. Method of applying such composition.

METHOD AND COMPOSITION FOR PHOSPHATE REMOVAL

BACKGROUND OF THE INVENTION

In the past much effort has been made to reduce the phosphate content of sewage by precipitating the phosphates chemically with such treating materials as lime and alum, iron salts, soda ash, and sodium aluminate. In order to effect any reasonable amount of phosphate removal it is necessary to employ as much as 20 to 200 parts per million of such reactants in the sewage to be treated. Not only is the required amount of such treating materials excessively high but also the effect produced by such prior art reagents is not considered completely acceptable.

SUMMARY OF THE INVENTION

The problems encountered in the prior art are significantly solved in accordance with this invention by treating liquid which is a solution of caustic soda (NaOH), aluminum hydrate $(Al(OH)_3)$, starch and water. By using as little as 1 to 5 parts per million of such a solution, 80 to 98 percent phosphate removal from waste and sewage water can be effected.

Accordingly it is an object of the invention to provide a reagent which will effectively remove high percentages of phosphates from waste and sewage waters.

An additional object of the invention is to provide a reagent which will remove significant amounts of phosphates from waste and sewage waters when present in such waters in amounts as low as 1 to 5 parts per million.

It is a further object of this invention to provide a method for treating sewage waters, which method will be effective in removing large quantities of phosphates when phosphates are present in such waters.

DESCRIPTION OF THE PREFERRED EMBODIMENTS

The composition of the instant invention generally comprises a solution of caustic soda (NaOH), aluminum hydrate $(Al(OH)_3)$, starch and water. Fundamental to the composition of the invention is that the constituents which combine in solution produce a stable reagent. In order to produce operative results it is necessary that the constituents which make up the phosphate removing reagent combine in such a manner so as to produce a floclike substance when added to the water system to be treated. It has been discovered that the percentages of the various constituents which make up the phosphate removing reagent are critical in order to produce the desired stable reagent with such floclike forming properties.

In one embodiment of the invention phosphate removing reagents having a composition as shown in table 1 were prepared:

TABLE 1

| Constituent | Amount of Constituent in Grams |
| --- | --- |
| Caustic soda (NaOH) | 25 |
| Aluminum hydrate $(Al(OH)_3)$ | 25 |
| Starch | 2 |
| Water | 48 |
| Total | 100 |

As a result of combining the constituents shown in table 1 in the percentages indicated, products were produced which when tested not only assisted in suspended solid removal by flocculation, but also reduced the phosphate content of 80 to 98%, depending on operating conditions. It is to be understood that the term "starch" in table 1 is generic. A large number of starches were used in various preparations, the details of which are given below.

Although it is not entirely clear why the composition ranges are critical, numerous tests have indicated that a significant deviation from the ranges shown in Table 2 below will produce an inferior product. In fact, it has been found that when the proportions indicated in Table 2 differ by an amount greater than approximately 1.5%, an extremely viscous gel or product having incompletely dissolved particles of starch or aluminum oxide results. By maintaining the proportions shown in Table 2 (within approximately 1.5%) a somewhat viscous liquid which is clear in appearance results. Such a liquid is more stable than that which would be produced by other proportions of the same ingredients. In Table 2 the ranges of the constituents are in grams and are dissolved in enough water to yield a solution with a total weight of 100 grams.

TABLE 2

| Constituent | Range in Grams |
| --- | --- |
| Caustic soda (NaOH) | 24–30 |
| Aluminum hydrate $(Al(OH)_3)$ | 24–30 |
| Starch | 1–4 |
| Water adjusted to yield a 100 gram solution | 51–36 |

It has been noted, however, that a stable formulation which deviates from table 2 by a few percent is possible through the action of superheated temperatures or ultrasonic vibrations. However, economics are a significant aspect of the invention, thus simple heating and cooling techniques are preferred to other techniques since the manufacturing costs of a reagent prepared by simple techniques are notably less than the costs of reagents prepared by more complicated techniques. However, the composition shown in table 2 is not intended to be limiting when compared to others compositions which deviate from table 2 when the products having such deviations are produced by superheating or ultrasonic vibration techniques. Thus when used throughout this specification and claims, reference to ranges of constituents in solution shall be construed to be based on solutions prepared by simple heating and cooling techniques. Solutions with constituent ranges exceeding those found in this specification and claims are intended to be within the range of equivalency when such increased ranges result from superheating or ultrasonic vibration techniques.

Tables 1 and 2 disclose starch as an essential constituent of the phosphate removing reagent of the instant invention. The starch employed in all embodiments of the invention is modified chemically by the caustic alkalinity of sodium hydroxide (NaOH) to form a type of natural polymer which ties up, entwines and/or enmeshes resulting particles of aluminum phosphate and/or aluminum phosphate-aluminum hydroxide (reaction given below). If the composition includes an iron salt, the natural polymer entwines and/or enmeshes particles of iron phosphate and/or iron phosphate-iron hydroxide. The formation of a natural polymer results in the production of the floc discussed above which settles rapidly and removes phosphates by precipitation. The term "natural polymer" as used throughout this specification refers to a substance which results from a change in the length of the units which comprise starch. For example, starch is a collection of maltose (simple sugars) which are chemically linked. Hydrolysis of these units in an alkaline medium causes some change in the length of the units. In addition to the formation of a natural polymer, hydrolysis also forms active or charged sites. These sites are believed to aid coagulation which adds to the utility of the starch compositions of the instant invention. An important aspect of the heavy floc which is held together by the natural polymer (starch) is that the floc by coagulation carries other suspended solids with it, allowing for easier solids removal by mechanical equipment with less retention time in settling basins.

In accordance with the instant invention only unmodified starch is usable and any unmodified starch can be utilized if a factor such as cost is not considered. Tests were conducted with unmodified potato starch, corn starch, rice starch and wheat starch. In most instances potato starch produced superior results in field tests involving waste water. Arrowroot and tapioca starches will also produce operative results. However, cost and availability render starches such as these economically unfeasible. Imperative to the composition of the invention is that the starch indicated in tables 1 and 2 be unmodified starches which are hydrolyzed by the causticity of sodium hydroxide. Modified starches, whether modified by an acid or a base (caustic), will not produce operative results in accordance with this invention.

In accordance with the present invention the following examples were prepared:

EXAMPLE 1

25 grams caustic soda (solid NaOH), 25 grams aluminum hydrate (solid Al(OH)$_3$), and 1 gram of unmodified potato starch were added to a sufficient amount of water with heavy agitation to yield a 100-gram solution. This solution was heated to 225° F. During heating the agitation was decreased. The solution was allowed to cool to 125° F. and 1 gram of potato starch was added and the solution was agitated vigorously for 20 to 30 minutes or until the solution contained no lumps.

EXAMPLE 2

In this example the procedure outlined in example 1 was followed except corn starch was employed which, like the potato starch of example 1, was added in two 1-gram portions.

Examples were also prepared under identical conditions with the other unmodified starches previously mentioned. In each instance tests with reagents containing such starches produced satisfactory results.

Because the phosphate removing reagent is a liquid, advantages result when applying the reagent to the water system to be treated. The composition can be utilized in a concentrated liquid form which can be fed directly from the shipping drum with a positive displacement proportioning pump. It has been found that the reagent does not interfere with biological activity so that the reagent can be applied safely to any water system. An additional advantage is that the heavy flock will reform if distributed or passed through pumps.

The method of utilizing the phosphate removing reagent described above involves simply applying the reagent into the water system to be treated. When such reagent is applied to a water system, a floclike film is formed. In addition to impurities being removed by the holding properties of the floc, a chemical reaction also occurs which effectively removes phosphates. This reaction is one which is thought to be the formation of an insoluble precipitate of aluminum phosphate or a complex precipitate of aluminum hydrate and phosphate. The reactions which are believed to occur are indicated below:

$$Al^{+3} + PO_4^{-3} \rightarrow AlPO_4 \quad (1)$$

$$[al_2O_3 \cdot H_2O_x]^+ + PO_4^{-3} \rightarrow Al_2O_3 \cdot H_2O_x \cdot PO_4 \quad (2)$$

Due to the reaction of the reagent with phosphate radicals, low amounts of reagents are required. Thus dosages of reagent as low as 2 parts per million will remove a significant amount of phosphates from the water system. The reagent can be used alone or it can be used in conjunction with primary coagulants such as alum, aluminum salts, iron salts, waste pickle liquor and pH adjusting chemicals and lime and soda ash. A dosage of 2 parts per million of the phosphate removing reagent with 10 parts per million ferric chloride has been found to be very effective in certain effluents. Also 2–5 parts per million of the reagent alone with some dosages of lime or alum have shown excellent results.

By providing a phosphate removing reagent as described above a product is produced which when present in relatively low dosages exhibits a high percentage of phosphate removal from sewage.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

1. A reagent for removing phosphate ions from a water system comprising a solution consisting essentially of the following approximate range of constituents per 100 gram of solution:

| Constituent | Range in Grams |
| --- | --- |
| Caustic soda (NaOH) | 24–30 |
| Aluminum hydrate (Al(OH)$_3$) | 24–30 |
| Unmodified starch | 1– 3 |
| Water | balance | said unmodified starch being a starch which is untreated by an acid or a base.

2. The reagent as set forth in claim 1 wherein said constituents are present in approximately the following amounts:

| Constituent | Amount in Grams |
| --- | --- |
| Caustic soda | 25 |
| Aluminum hydrate | 25 |
| Unmodified starch | 2 |
| Water | balance |

3. The reagent as set forth in claim 1 wherein said unmodified starch is potato starch.

4. The reagent as set forth in claim 1 wherein said unmodified starch is corn starch.

5. The reagent as set forth in claim 1 wherein said unmodified starch is selected from the group consisting of rice starch, wheat starch, arrowroot starch and tapioca starch.

6. A method of removing phosphate ions from a water system comprising the step of applying to said water system a reagent comprising a solution consisting essentially of the following approximate range of constituents per 100 grams of solution:

| Constituent | Range in Grams |
| --- | --- |
| Caustic soda (NaOH) | 24–30 |
| Aluminum hydrate (Al(OH)$_3$) | 24–30 |
| Unmodified starch | 1– 4 |
| Water | balance | said unmodified starch being a starch which is untreated by an acid or a base.

7. The method as set forth in claim 6 wherein said constituents are present in approximately the following amounts:

| Constituent | Amount in Grams |
| --- | --- |
| Caustic soda | 25 |
| Aluminum hydrate | 25 |
| Unmodified starch | 2 |
| Water | balance |

8. The method as set forth in claim 6 wherein said unmodified starch is potato starch.

9. The method as set forth in claim 6 wherein said unmodified starch is corn starch.

10. The method as set forth in claim 6 wherein said unmodified starch is selected from the group consisting of rice starch, wheat starch, arrowroot starch and tapioca starch.

11. A method of preparing a solution of caustic soda, aluminum hydrate, unmodified starch and water comprising the steps of:
   a. mixing with agitation of about 24–30 grams caustic soda, about 24–30 grams aluminum hydrate and about 1–4 grams of unmodified starch with a sufficient amount of water to produce a 100-gram solution, said unmodified starch being a starch which is untreated by an acid or a base,
   b. heating the resulting mixture to approximately 225° F.,
   c. cooling the mixture to approximately 125° F., and
   d. agitating the mixture at approximately 125° F. to produce a homogeneous solution.

12. The method as set forth in claim 11 wherein the starch is added in two approximately equal portions, the first portion being added before said mixture is allowed to cool to 125° F. and the second portion being added after said solution has been cooled to 125° F.

UNITED STATES PATENT OFFICE
CERTIFICATE OF CORRECTION

Patent No. 3,607,742        Dated September 21, 1971

Inventor(s) William C. Steigerwald, Jr.

It is certified that error appears in the above-identified patent and that said Letters Patent are hereby corrected as shown below:

Column 1, line 72, "of" should read --by--.

Column 2, lines 35, 42 and 44, "table" should read --Table--;

line 59, "and/or" should read --or--.

Column 3, second structural formula should read as follows:

$$--[Al_2O_3 \cdot H_2O_x]^+ + PO_4^{-3} \rightarrow Al_2O_3 \cdot H_2O_x PO_4 --$$

Column 4, claim 1, in the table, second column, line 4 should read -- 1 - 4 --;

line 64, "grams" should read --gram--.

Column 6, line 5 "of" should be omitted.

Signed and sealed this 11th day of July 1972.

(SEAL)
Attest:

EDWARD M. FLETCHER, JR.        ROBERT GOTTSCHALK
Attesting Officer              Commissioner of Patents